(12) United States Patent
Azar et al.

(10) Patent No.: US 10,944,345 B2
(45) Date of Patent: Mar. 9, 2021

(54) CONTROLLING A MULTI WINDING SET PERMANENT MAGNET ELECTRICAL MACHINE

(71) Applicant: SIEMENS GAMESA RENEWABLE ENERGY A/S, Brande (DK)

(72) Inventors: Ziad Azar, Sheffield (GB); Nuno Miguel Amaral Freire, Brande (DK); Arwyn Thomas, Cheshire (GB)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 4 days.

(21) Appl. No.: 16/263,233

(22) Filed: Jan. 31, 2019

(65) Prior Publication Data
US 2019/0238077 A1   Aug. 1, 2019

(30) Foreign Application Priority Data

Feb. 1, 2018   (EP) ..................................... 18154710

(51) Int. Cl.
| | |
|---|---|
| *H02P 21/05* | (2006.01) |
| *H02P 9/10* | (2006.01) |
| *H02P 25/22* | (2006.01) |
| *F03D 9/25* | (2016.01) |
| *H02P 21/22* | (2016.01) |
| *H02J 3/36* | (2006.01) |
| *H02P 101/15* | (2016.01) |

(52) U.S. Cl.
CPC .............. *H02P 21/05* (2013.01); *F03D 9/257* (2017.02); *H02P 9/10* (2013.01); *H02P 9/107* (2013.01); *H02P 21/22* (2016.02); *H02P 25/22* (2013.01); *H02J 3/36* (2013.01); *H02P 2101/15* (2015.01)

(58) Field of Classification Search
CPC .. H02P 21/05; H02P 21/22; H02P 9/10; H02P 9/107; H02P 25/22
See application file for complete search history.

(56) References Cited

U.S. PATENT DOCUMENTS

| | | | |
|---|---|---|---|
| 2007/0010877 A1 | 1/2007 | Salahieh et al. | |
| 2013/0320938 A1* | 12/2013 | Deng | ........................ H02P 9/08 322/90 |
| 2014/0175796 A1* | 6/2014 | Rasmussen | ............. F03D 7/028 290/44 |
| 2015/0288310 A1* | 10/2015 | Pace | ........................ H02P 21/18 318/400.02 |

(Continued)

FOREIGN PATENT DOCUMENTS

| | | |
|---|---|---|
| EP | 2372860 A1 | 10/2011 |
| EP | 2485388 A1 | 8/2012 |

(Continued)

*Primary Examiner* — Sean Gugger
(74) *Attorney, Agent, or Firm* — Schmeiser, Olsen & Watts LLP

(57) ABSTRACT

Provided is a method and arrangement for controlling a multi winding set permanent magnet electrical machine in case of a fault in a first group of the winding sets leaving a second group of the winding sets functional, the method comprising: determining a value of a torque generated by all winding sets; and controlling values of currents of the second group of winding sets based on the value of a torque, in order to reduce a damaging torque and/or a torque oscillation occurring and/or to break the machine.

12 Claims, 13 Drawing Sheets

(56) References Cited

U.S. PATENT DOCUMENTS

| | | | | |
|---|---|---|---|---|
| 2015/0311719 | A1* | 10/2015 | Andresen | F03D 9/257 307/82 |
| 2015/0365032 | A1* | 12/2015 | Katsumata | H02P 21/22 318/802 |
| 2016/0204601 | A1* | 7/2016 | Donescu | F03D 7/0272 361/21 |
| 2016/0285251 | A1* | 9/2016 | Urresty | H02P 29/027 |
| 2017/0279391 | A1* | 9/2017 | Freire | H02P 9/42 |
| 2017/0317623 | A1* | 11/2017 | Taniguchi | H02P 6/18 |
| 2019/0137568 | A1* | 5/2019 | Freire | F03D 9/25 |
| 2019/0140564 | A1* | 5/2019 | Li | H02P 6/08 |

FOREIGN PATENT DOCUMENTS

| | | |
|---|---|---|
| EP | 2670027 A1 | 12/2013 |
| EP | 2747258 A2 | 6/2014 |
| EP | 2940860 A1 | 11/2015 |
| EP | 3223422 A1 | 9/2017 |
| WO | 2014079453 A2 | 5/2014 |
| WO | WO 2014079453 A2 | 5/2014 |

* cited by examiner

CONTROLLING A MULTI WINDING SET PERMANENT MAGNET ELECTRICAL MACHINE

This application claims priority to European application No. EP 18154710.0, having a filing date of Feb. 1, 2018, the entire contents of which are hereby incorporated by reference.

FIELD OF TECHNOLOGY

The following relates to a method and an arrangement for controlling a multi winding set permanent magnet electrical machine in case of a fault in a first group of winding sets leaving a second group of the winding sets functional. In particular, the following relates to a control method intended for damping torque oscillations and/or suppressing currents due to a short-circuit fault in one of the winding sets of the stator of a multi stator permanent magnet machine.

BACKGROUND

A single machine stator may be composed of two or more three-phase or multiphase winding sets. Short-circuit faults in the grid-side converter portion of a wind energy conversion system attracts a lot of attention. In the prior art, there is little work on damping/compensation of torque oscillations due to the generator short-circuit occurrences.

In the documents EP 2 372 860 A1 and WO 2014/079453 A2, oscillations introduced by a phase-to-phase short-circuit fault are minimized by forcing a three-phase short-circuit by means of an additional switching device.

EP 3 073 635 A1 discloses a method for protecting a permanent magnet generator which has a number of isolated converters, the multiphase generator including a rotor carrying permanent magnets and a number of independent multiphase sub-stators comprising a plurality of windings. Thereby, each converter is connected to an independent multiphase sub-stator and is configured to control the plurality of windings of the multiphase sub-stator. Thereby, an asymmetric short-circuit is determined in one of the sub-stators which generates a first oscillating torque and an asymmetric current is injected with the intact connected converters, wherein said injected asymmetric current generates a second oscillating torque that is substantially opposed in phase to the first oscillating torque.

In the prior art solutions reacting on faults in one or more winding sets of a multi winding set generator may not be satisfactory in all situations, leaving the risk of damage of components of the generator.

Thus, there may be a need for a method and for an arrangement for controlling a multi winding set permanent magnet electrical machine in case of a fault in a first group of winding sets, wherein damage of components can be reduced and the generator, in particular of a wind turbine, can be operated in a safe manner.

SUMMARY

According to an embodiment of the present invention, a method includes controlling a multi winding set permanent magnet electrical machine in case of a fault in a first group of the winding sets leaving a second group of the winding sets functional, the method comprising: determining a value of a torque generated by all winding sets; and controlling values of currents of the second group of winding sets based on the value of a torque, in order to reduce a demagnetisation current and a damaging torque and a torque oscillation occurring and/or to break the machine.

The method may for example be performed by a wind turbine controller or in general a generator controller controlling the electrical machine. The electrical machine may comprise one or two or three or four or five or even more independent sets of windings which are at least partially wound in slots of a stator of the electrical machine. To each of the independent (electrically isolated from each other) winding sets, a respective converter may be connected. Each winding set may comprise two or three or four or five or even more wires each associated with a particular phases. In particular, each winding set may comprise three wires for providing three phases of electric energy.

The permanent magnet electrical machine may be configured as a generator for generating electrical energy. The generator may be a part of a wind turbine and may be connected to a rotor shaft having a hub at which plural rotor blades are connected.

The fault in the first group of winding sets may comprise a short-circuit between one or more phases of one winding set or more winding sets of the first group of winding sets to another phase or a neutral conductor or an earth (mass) conductor of one or more winding sets of the first group of winding sets. The fault (involving large electrical currents) may result in each winding set of the first group of winding sets to be dysfunctional. Due to the fault, the permanent magnet electrical machine may finally be stopped, in order to allow fixing or repairing damages in particular on the first group of winding sets.

A rotor having attached thereto plural permanent magnets may be rotatably supported relative to the stator of the electrical machine such that upon rotation of the permanent magnets relative to the stator yoke and thus relative to the winding sets, electrical voltage may be induced in the winding sets. The electrical voltage induced in the winding sets may then be supplied to the converters in order to convert the in particular variable frequency power stream to a in particular essentially fixed frequency (for example 50 Hz or 60 Hz) power stream which may then be supplied to an utility grid.

The value of the torque may be determined in a number of methods. The torque may for example relate to a mechanical torque between the rotor and the stator. The determined value of the torque may partly be associated with a portion generated by the first group of winding sets and a portion generated by the (functional) second group of winding sets.

According to an embodiment of the present invention, the still functional second group of winding sets can be utilized for safely shutting down the generator in a controlled manner, i.e. slowing down the rotational speed of the rotor to essentially zero. Further, during the controlled shutting down or stopping the electrical machine, forces or torques higher than maximally allowed torques may be avoided.

The functional group of windings can be also utilized to reduce the fault torque and current till the breaker of the fault set is open and keep the turbine in reduced order operation till the service is available.

When the control of the values of the currents of the second group of winding sets is based on the value of the torque, the method may be improved in comparison to methods of the prior art. The value of the torque may thus act as a feedback signal for the system or the method. In prior art solutions, the total torque has not been considered as a feedback signal. The value of the torque may be measured, estimated from indirect measurements and/or estimated from electrical measurements or electrical properties of the winding sets.

In particular, a short-circuit torque controller according to embodiments of the present invention may include an Id and/or an Iq control, i.e. control of the d-component and/or the q-component of the currents of the intact winding sets. Further, new feedback signals, such as the value of the torque may be utilized which ease the implementation and may increase the applicability. The control method may aim to minimize torque oscillations and fault current when short-circuit faults occur on one or more systems, i.e. winding sets, namely on a stator of a multi stator generator, by taking advantage of the healthy winding sets that are still controllable. Moreover, the control method may allow the electrical machine (in particular generator of a wind turbine) to slow down faster by using the regenerative torque developed by the healthy (functional) winding sets or stators and consequently the short-circuit currents may be extinguished faster which may reduce the risk of demagnetization of one or more of the permanent magnets.

In general, the likelihood of having a short-circuit fault effecting simultaneously all winding sets or all stators of a multi stator generator may be extremely low. Therefore, an effective method of reducing loads resulting from a short-circuit fault in a single stator may have a positive feedback to component design, such as blade and tower designs. In addition, in the permanent magnet machine, the magnets may also be designed to withstand the irreversible demagnetization due to large short-circuit current. These design requirements may lead to cost increases in the prior art. Embodiments of the present invention may have the benefits of reducing turbine extreme load and mitigating the risk of component damage as a consequence of a generator short-circuit fault. Embodiments may require an extra torque transducer. This would be the case, only if a direct torque feedback is desired, which is of difficult implementation in a turbine. More attractive options are the use of already installed sensors (accelerometers and/or speed sensors) or estimation using electrical measurements from the healthy windings.

Methods are applicable to dual three-phase electrical machines as well as the multi system electrical machines. Embodiments of the present invention provide a control method for damping torque oscillations resulting from generator short-circuit fault and simultaneously, reducing overspeeding, short-circuit currents and/or stopping times.

The embodiments of the present invention may require previously to run a short-circuit fault detection method which may typically be available in a conventional control system which is able to identify the affected winding set or winding sets. Embodiments of the present invention also provide procedures to obtain the value of the torque which is then used as a feedback to the control method. Embodiments of the present invention support stopping the generator in case of a short-circuit fault in a permanent magnet generator, in order to extinguish short-circuit currents. Thus, embodiments allow lowering the rotational speed of the rotor thereby lowering the currents and the risk of damaging the generator (in particular regarding demagnetization and/or overheating). The electromagnetic torque developed by a faulty winding set or faulty stator may be highly oscillatory depending on the short-circuit type.

Typically, in a wind turbine, a generator short-circuit may quickly be detected by a detection method implemented in the control system which may force all power converters to shut-down and trigger an emergency stop. Conventionally, the shut-down or stop of all converters and bringing the rotational speed to zero may be achieved by means of the blade pitch control and a mechanical break, which may take several seconds.

In order to mitigate this problem, embodiments of the present invention allow the generator to break as fast as possible and with minimum oscillation in order to reduce loads and minimize the risk of component damage. Thereby, embodiments of the present invention utilize the contribution of the power converter of the healthy winding sets or healthy stator, enabling the healthy stator (or healthy winding sets) to generate a breaking torque and damp torque oscillations. Accordingly, only the converter connected to the faulty stator or faulty winding sets may be shut-down, while the healthy winding may stay under control of the respective converter, but with a modified target or reference.

Embodiments of the present invention may apply two control options separately or in combination, in particular Id control under a short-circuit fault and/or Iq control under a short-circuit fault. Further, a short-circuit controller may combine the two options or simply choose one of them. Furthermore, a controller combining both options is included in embodiments of the present invention.

According to an embodiment of the present invention, controlling values of currents of the second group comprises controlling values of a d-component and/or a q-component of the currents of the second group of winding sets based on the value of the torque. Including control of the d-component and/or the q-component of the currents of the healthy winding sets may improve the method for damping oscillations and/or quickly breaking the generator.

According to an embodiment of the present invention, controlling the values of the d-component of the currents of the second group of winding sets comprises setting a fault reference value of the d-component of the currents of the second group of winding sets based on a sign of the value of the torque.

The values of the d-component may be set to higher or greater negative values, thereby increasing the absolute values of these values of the Id currents in case of a fault and in case the torque sign is negative. By convention, torque is considered negative when in generating mode, i.e. when the generator produces electric energy. In this case, the magnetic flux may advantageously be reduced also indirectly counteracting oscillatory torque. In particular, the fault reference value of the d-component of the current may be set to a value which is more negative than a previously (during normal operation) used value. In a coordinate system being fixed to the stator, such as the $\alpha,\beta$-coordinate system, setting the d-component of the current to a more negative value may correspond or be equivalent to increasing the current angle, i.e. increasing the lag of the current with respect to the voltage. This may be equivalent to set a higher (more negative) value of the d-component of the currents of the healthy winding sets, i.e. the second group of winding sets. Thereby, the short-circuit torque of the machine and the phase current of the faulty system may be reduced. Thus, when a short-circuit fault in one system is sensed (using torque/current measuring devices (sensors) for example), the current angle of the healthy system may be increased, to suppress the permanent magnet flux linkage (back-EMF), which may be the exciter of the fault. This control option may also be referred to as current angle control.

According to an embodiment of the present invention, if the sign of the value of the torque is negative, the fault reference value of the d-component of the currents is set to a negative value, in particular negative fixed value supported by the converters connected to the second group of winding sets. Thereby, the torque may be effectively counteracted by reducing the permanent magnet flux linkage.

According to an embodiment of the present invention, if sign of the value of the torque is positive, the fault reference value of the d-component of the currents is set to zero. This may in particular be applicable when an oscillation of the torque is observed, i.e. in which the torque changes direction. In case the torque is positive the generator is in motoring mode, not producing electric energy.

For positive torque, Id*,sc=0, but I*d may be negative.

According to an embodiment of the present invention, the Sign function may be given as below:
Sign=0, if Torque >=0
Sign=−1, if Torque <0

Thereby, an effective damping of oscillations of the torque may be achieved. Thus, in order to reduce torque oscillations multi-current angle changes in the healthy winding set may be implemented to diminish the torque oscillation. Thereby, the absolute value of the d-component of the current may be enlarged after fault occurrence and it may be changed back when the torque turns to have a positive sign, increased again (to a negative value) when the torque turns negative and so on until the torque is damped or generator circuit breaker operated.

According to an embodiment of the present invention, controlling the values of the q-component of the currents of the second group of winding sets comprises: deriving a reference of a counteracting torque counteracting a torque oscillation based on an oscillation portion, in particular derived using a band pass filter or high pass filter, of the determined value of the torque; deriving a fault reference of the q-component of the currents from the reference of the counteracting torque.

The control of the q-component of the currents may be combined with the control of the d-component of the currents or may be applied separately according to embodiments of the present invention. The oscillation portion of the value of the torque may be derived from the value of the torque (which may be continuously determined and provided over time) using a band pass filter which may eliminate oscillation outside a pass window. In particular, the q-control may be applicable to a dual-stator machine with isolated neutral points and no spatial shift between windings.

According to an embodiment of the present invention, controlling values of the q-component of the currents of the second group of winding sets comprises: deriving a reference of a counteracting breaking torque counteracting a torque oscillation and breaking the machine, based on an oscillation portion of the determined value of the torque and a breaking torque reference; deriving a fault reference of the q-component of the currents from the reference of the counteracting breaking torque.

When also the torque oscillation is taken into account for deriving the reference of the counteracting breaking torque it may be avoided to keep the torque the generator is subjected to below thresholds in order to not damage the machine.

According to an embodiment of the present invention, the breaking torque reference is determined such that the reference of a counteracting breaking torque is below a maximally possible torque that can be generated.

According to an embodiment of the present invention, deriving a fault reference of the q-component of the currents further comprises applying a limitation on torque and/or current. Applying the limitation on torque and/or current may also protect components from damage.

According to an embodiment of the present invention, determining a value of the torque comprises: measuring the torque; and/or measuring, in particular using at least one accelerometer, a vibration of at least one component of the machine or wind turbine or a speed of the rotor; and deriving the value of a torque from the measured vibration or the measured speed; and/or estimating the torque by using one or more observers of speed of rotor and/or electromagnetic torque of the second group of winding sets.

Embodiments of the present invention may require a torque feedback source representative of the generator load torque which may be given as the sum of the electromagnetic torque of the plural winding sets (the faulty ones and the functional ones), the torque due to the acceleration of the machine as well as the torque due to the damping of the machine. Taking into account that the short-circuit faults nature/type may be unknown, the electromagnetic torque of the faulty systems cannot be estimated. Alternatively, three options for deriving a torque feedback signal are suggested below:
1) Direct measurement for example by means of a strain gauge or any kind of torque sensor in the machine shaft.
2) Indirect measurement by means of sensors readily available in a wind turbine. Some examples of sensors possibly available in a wind turbine for control and monitoring are accelerometers in the generator and strain gauges in the blades. Such measured signals may be manipulated in order to derive a signal representative of the torque oscillations introduced by a short-circuit fault which can then be used as a feedback.
3) Estimation of the load torque by means of an observer with basis on mathematical equations for the total torque like the following equation $$T_{Load} = T_{feedback} = T_{e,1} + T_{e,2} - J\frac{d\omega}{dt} - D\omega$$

To derive the load torque, the knowledge of the inertia J and the damping constant D is required. Such observer may use speed and electromagnetic torque from the healthy system as inputs and estimate the sum of load torque and electromagnetic torque of the short-circuit system ($T_{load}$ $T_{e,SC}$). Such observers may make use of speed/position sensors or observers.

Options 2 and 3 may be considered the most attractive ones for a wind turbine, since additional hardware may not be required.

According to an embodiment of the present invention, the second group of winding sets is connected respectively to a second group of converters, wherein controlling values of currents of the second group of winding sets comprises controlling the second group of converters. Thereby, the currents may be appropriately controlled and controlled in a simple manner supporting conventional devices.

According to an embodiment of the present invention, before the fault, the first group of winding sets is connected respectively to a first group of converters, the method further comprising: after detection of the fault, disconnecting the first group of winding sets from the first group of converters. When the first group of winding sets is disconnected, the converters may be protected from damage as well as other components of the generator.

According to an embodiment of the present invention, each one of the first and/or the second group of converters comprises a generator side converter, a DC-link and a grid side converter, wherein before detection of the fault the generator side converters perform voltage control of the DC-link; wherein after detection of the fault the generator side converters are switching to torque control; wherein after detection of the fault the grid side converters are switching to voltage control of the DC-link.

During normal operation it may be advantageous that the generator side converter applies a voltage control method to control the voltage at the DC-link. In case of a fault, the particular second group of converters switches to a torque control in order to effectively damp torque oscillations and/or improve the breaking. In this situation, the grid side converter may be used for voltage control of the DC-link.

According to an embodiment of the present invention, the method further comprises dividing the fault reference value of the d-component and/or the fault reference value of the q-component of the currents of the second group of winding sets, in respective reference portions in dependence of the number of second group converters; supplying to each of the converters of the second group of converters a reference signal that depends on one of the reference portions.

The fault reference value of the d-component and/or q-component of the current may be divided in same or equal portions and supplied to respective converters connected to the second set of winding sets. In other embodiments, particular generators may be supplied with individually scaled portions which as a sum equal to the fault reference value of the respective component of the currents. Thereby, an effective distribution of the counteracting torques and breaking torques to the multiple winding sets of the second group of winding sets may be achieved.

It should be understood that features individually or in any combination, disclosed, described or explained with respect to a method of controlling a multi winding set permanent magnet electrical machine may also be applied, individually or in any combination to an arrangement for controlling a multi winding set permanent magnet electrical machine according to embodiments of the present invention and vice versa.

According to an embodiment of the present invention it is provided an arrangement for controlling a multi winding set permanent magnet electrical machine in case of a fault in a first group of the winding sets leaving a second group of the winding sets functional, the arrangement comprising: a determining portion adapted to determine a value of a torque generated by all winding sets; a controller adapted to control values of currents of the second group of winding sets based on the value of a torque, in order to reduce a damaging torque and/or a torque oscillation occurring and/or to break the machine.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION

Some of the embodiments will be described in detail, with reference to the following figures, wherein like designations denotre like members, wherein:

FIG. 1 schematically illustrates a wind turbine including an arrangement for controlling a multi winding set permanent magnet electrical machine according to an embodiment of the present invention;

FIG. 2 schematically illustrates a generator controller including an arrangement according to an embodiment of the present invention;

FIG. 3 illustrates a block diagram in schematic form of an arrangement for controlling a multi winding set permanent magnet electrical machine according to an embodiment of the present invention;

FIG. 4 schematically illustrates a circuit diagram of a maximum amplitude calculator as used in embodiments according to the present invention;

FIG. 5 schematically illustrates a block diagram of another embodiment of an arrangement for controlling a multi winding set permanent magnet electrical machine;

DETAILED DESCRIPTION

Figure 1:
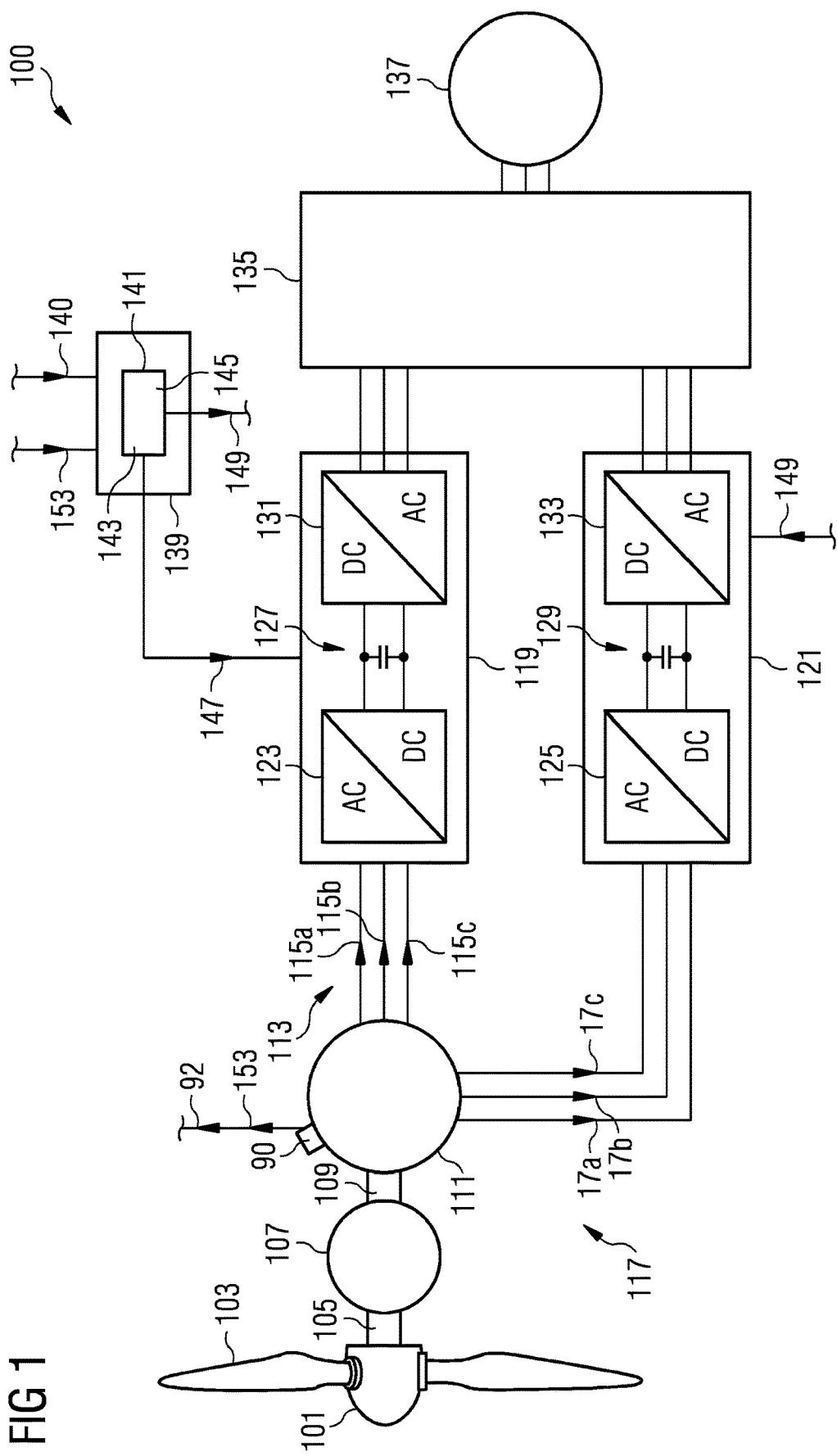

The illustration in the drawings is in schematic form. It is noted that in different figures, similar or identical elements are provided with the same reference signs or with reference signs, which are different from the corresponding reference signs only within the first digit.

The wind turbine 100 schematically illustrated in FIG. 1 comprises a hub 101 at which plural rotor blades 103 are mounted. The hub is mechanically connected to a rotation shaft 105, in particular a primary rotation shaft 105, which is mechanically connected to a gearbox 107. The optional gearbox 107 transforms the rotational speed of the primary shaft 105 to another rotational speed of a secondary shaft 109 which is mechanically coupled to a rotor of a generator 111 which is controlled according to embodiments of the present invention in case of a fault. At the generator 111 an accelerometer 90 is mounted for measuring a vibration signal 90 or torque indicating signal 153.

The gearbox 107 is optional, the rotor blades or primary rotation shaft 105 could be also directly coupled to the generator, it is called direct-drive (gearless) system.

In particular, the generator 111 is configured as a dual winding set permanent magnet generator having a first winding set 113 comprising the wires 115a, 115b, 115c and further comprises a second winding set 117 comprising the wires 117a, 117b, 117c for providing three phases. The first winding set 113 is electrically connected to input terminals of a first converter 119 and the second winding set 117 is electrically connected to input terminals of a second converter 121. The converters 119, 121 are essentially constructed in a same manner comprising a generator side AC-DC converter portion 123, 125, respectively, a DC-link 127, 129, respectively and a grid side DC-AC converter portion 131, 133, respectively. Output terminals of the converters 119, 121 are connected with a wind turbine transformer 135 which is connected, optionally via one or more additionally transformers, to a utility grid 137.

The wind turbine 100 further comprises a wind turbine controller 139 which comprises an arrangement 141 for controlling a multi winding set permanent magnet electrical machine according to an embodiment of the present invention. The arrangement 141 therefore comprises a determining portion 143 which is adapted to determine a value of a torque generated by all winding sets 113, 117. The arrangement 141 further comprises a controller 145 adapted to control values of currents of the first winding set 113 or the second set 117 of windings based on the value of the torque, in order to reduce a damaging torque and/or a torque oscillation occurring and/or to break the machine 111. In particular, the arrangement 141 controls the currents of a functional winding set (for example first winding set 113 or second winding set 117) which is functional, while one or more other winding sets are faulty, such as due to a short-circuit. In order to control the currents of those winding sets which are still functional, the arrangement 141 (and thus the wind turbine controller 139) outputs a respective first control signal 147 to the first converter 119 (if first winding set is functional) or provides a second control signal 149 to the second converter 121 (if the second winding set is functional). In particular, the control signals 147, 149 may be supplied to the respective generator side converter portions 123, 125 of the first and the second converters 119, 121, in order to in particular control controllable switches comprised in the generator side converter portions 123, 125. The arrangement 141 is configured to carry out a method for controlling a multi winding set permanent magnet electrical machine according to an embodiment of the present invention.

The electrical machine 111 is in the example illustrated in FIG. 1 configured as a dual three-phase electrical machine. In other embodiments, the electrical machine may be configured as having more than two winding sets and may be configured to have a higher number of phases (thus wires per winding set). In this case, the arrangement 141 is configured to supply respective control signals to those converters which are connected to the still functional (undamaged) winding sets, while the faulty winding sets may be disconnected from the respective converters.

Figure 2:
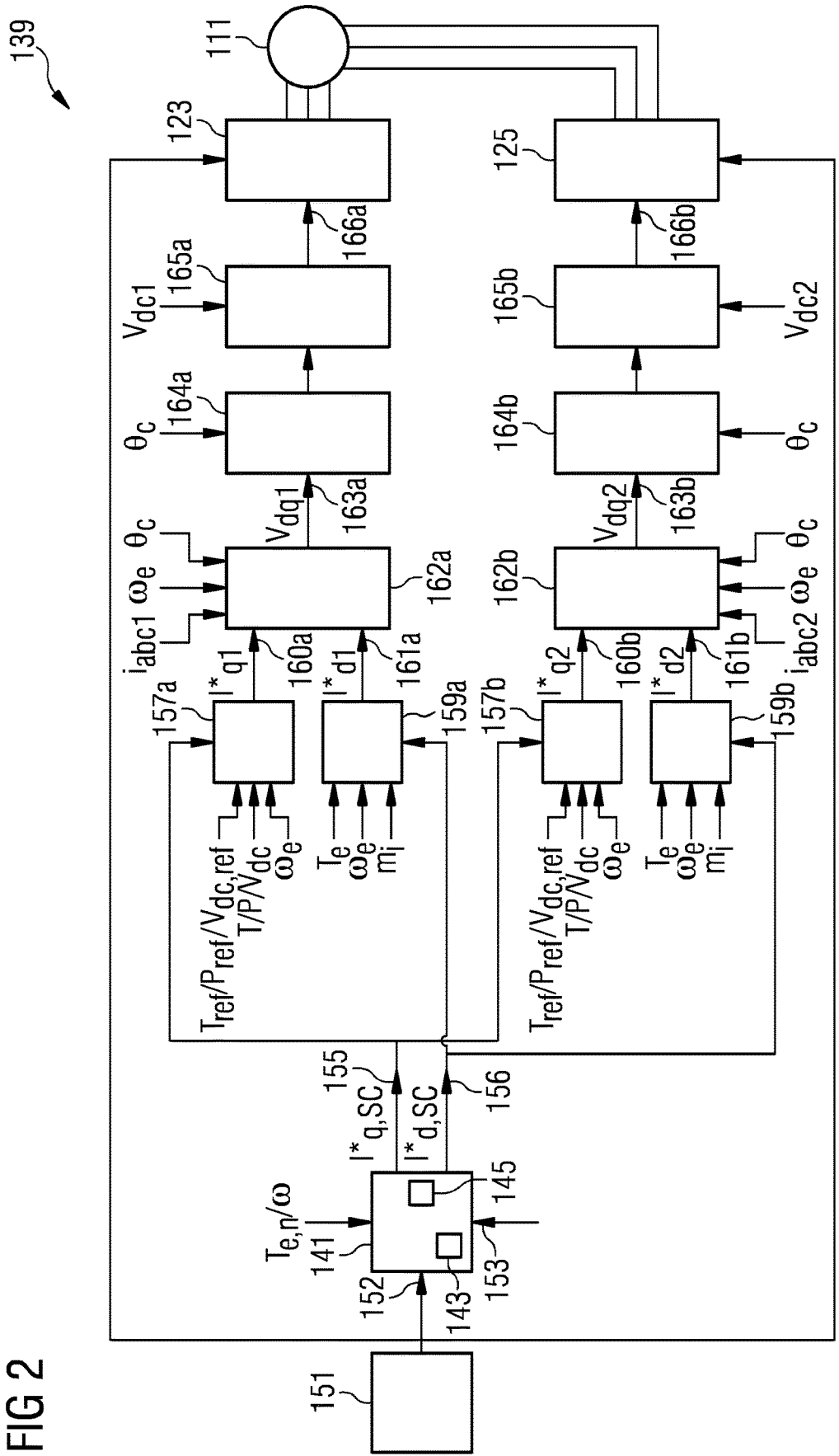

FIG. 2 schematically illustrates the wind turbine controller 139 illustrated in FIG. 1 in more detail. A short-circuit detection module 151 is configured to detect a fault and in particular a short-circuit in one of the winding sets of the electrical machine, such as by monitoring currents and indicating a short-circuit if the currents are higher than a threshold. A short-circuit detection signal 152 is supplied to the arrangement 141 for controlling a multi winding set permanent magnet electrical machine (also referred to as short-circuit torque controller). The arrangement 141 receives as input signals the electrical torques $T_{e,n}$ of all winding sets of the electrical machine and further receives the rotational speed w. Further, the arrangement 141 receives a torque related signal 153 from which the determining module 143 determines the value of a torque generated by all winding sets. Based on this value of the torque, the controller 145 of the arrangement 141 determines a fault reference of a q-component of the currents 155 ($I_{q,sc}^*$) and a fault reference of a d-component of the currents 156 ($I_{d,sc}^*$). For each winding set of the electrical machine, the controller 139 further comprises an Iq reference calculation module 157a, 157b, an Id reference calculation module 159a, 159b which receive the fault references 155, 156 of the q-component and the d-component, respectively, of the currents. The reference calculation modules 157, 159 further receive as inputs for example a torque reference, power reference or DC-link voltage reference, a torque, a power and a DC-link voltage, a rotational speed, in order to calculate a reference 160a, 160b of the q-component of the current and a reference 161a, 161b for the d-component of the current, wherein the suffix 'a' refers to the first winding set or respective first generator converter 123 and the suffix 'b' refers to second generator side converter 125.

Current controllers 162a, 162b derive from the references 160a,b, 161a,b voltage references 163a, 163b also optionally based on further input signals relating to the currents in the winding sets, the rotational speed and the rotational angle. Transformation modules 164a, 164b transform from the d-q coordinate system to the fixed coordinate system a,b,c and the output signals are provided to a modulator portion 165a, 165b which derive from their inputs pulse width modulation signals 166a, 166b which are provided to the generator side converter portions 123, 125, respectively.

Figure 3:
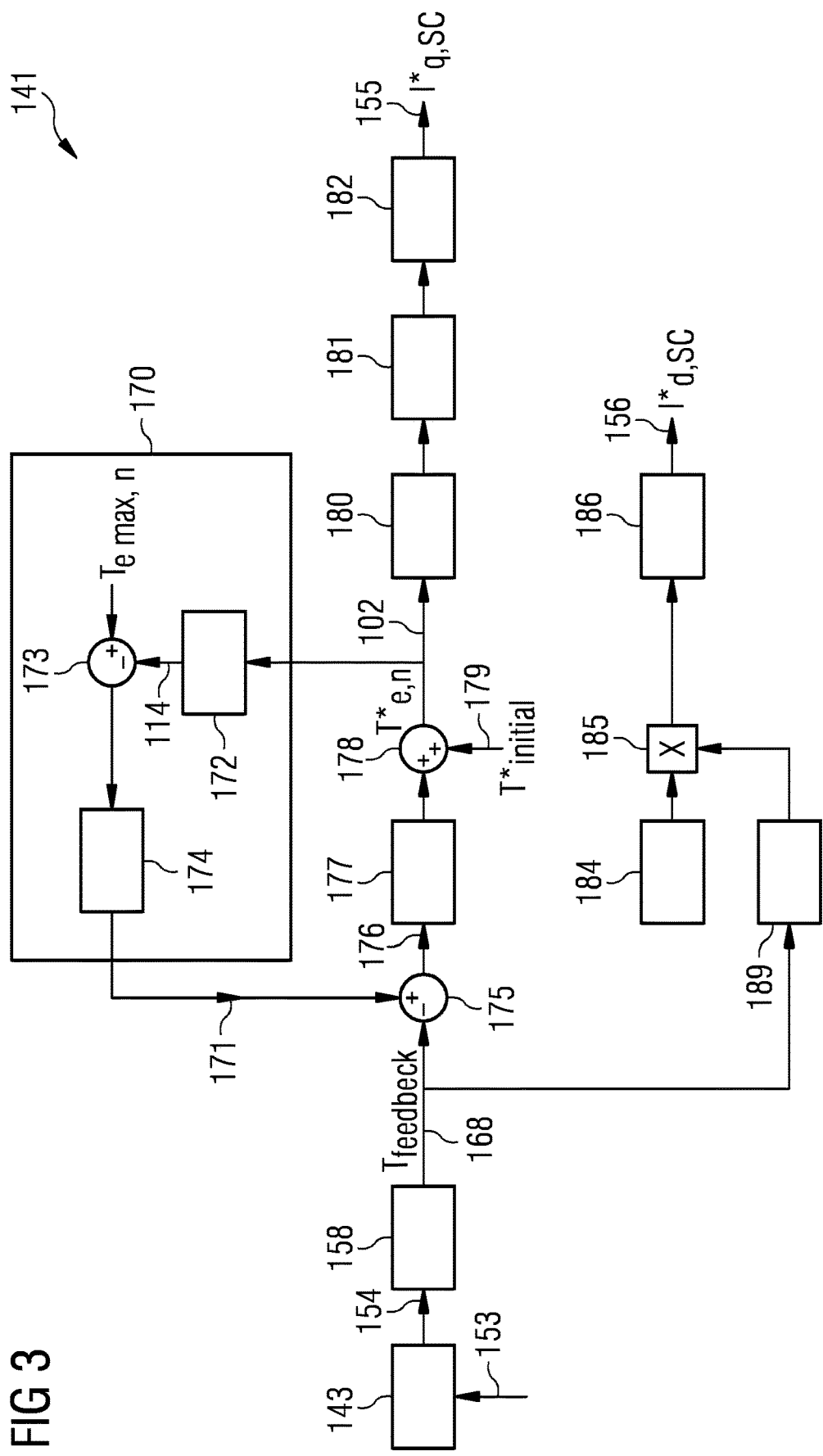

FIG. 3 schematically illustrates a block diagram of an arrangement 141 for controlling a multi winding set permanent magnet electrical machine in case of a fault according to an embodiment of the present invention. Thereby, Id and Iq control approaches are combined into a single short-circuit torque controller, wherein Id increment 184 is a constant pre-determined value. Therefore, priority may be given to either Id or Iq control which may be taken into account when applying the current limits. In other words, if priority is given to:

(1) Id, the fault reference of the q-component of the currents is limited in order to satisfy the fault reference of the d-component;

(2) Iq, then the fault reference of the d-component of the currents is limited in order to satisfy the fault reference of the q-component of the currents.

The determining portion 143 of the arrangement 141 receives the input signal 153 from which the value 154 of the torque prevailing in the electrical machine 111 is derived. For example, the input signal 153 may relate to a measured torque, to a measured acceleration and/or to electrical torque and/or rotational speed of the generator. Using a filtering block 158 the torque value 154 is band pass filtered or high pass filtered such as to derive an oscillation portion 168 which is then used as a feedback signal.

A breaking torque calculation module 170 provides a breaking torque reference 171 which is derived using a maximum amplitude calculator 172 which outputs a maximum amplitude 114 of the torque which is subtracted from a maximal electrical torque $T_{e\ max,n}$ and the difference is provided to a controller section 174. The difference is calculated using a difference element 173. Another subtraction element 175 determines the difference between the breaking torque reference 171 and the torque feedback signal 168 as a difference signal 176 which is provided to a controller portion 177 (such as PI-controller). The output of the controller 177 is provided to an addition element 178 to which an (optional) initial constant reference of the torque 179 is provided. The output of the addition element 178 is provided to a limitation element 180 which limits the torque to adjustable torque limits. The output of the limitation element 180 is provided to an Iq reference calculation module 181 which calculates therefrom references of the q-component of the currents which are supplied to a current limitation module 182 which applies current limits resulting in the fault reference of the q-component of the currents as labelled 155. The maximum amplitude calculator 172 also receives the fault reference 102 of the torque.

For deriving the fault reference 156 of the d-component of the current, the oscillation portion 168 of the torque is supplied to a sign determination module 189 which outputs for example 0 if the sign is positive and −1 if the sign is negative. The output of the sign calculation module 189 is multiplied with an Id increment (for example fixed positive increment provided by a storage or a register 184). The output of the multiplication element 185 is provided to a current limitation element 186 which applies current limits to which the d-component 156 of the fault reference adheres.

Figure 4:
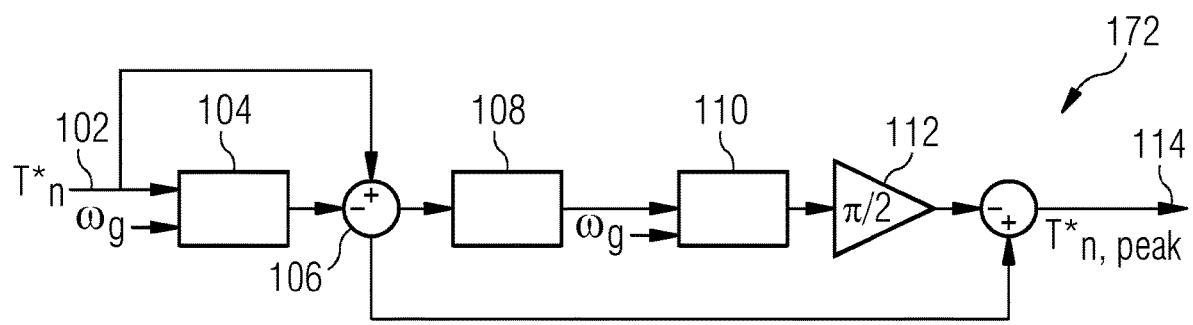

FIG. 4 schematically illustrates an embodiment of the maximum amplitude calculator 172 illustrated in FIG. 3. The maximum amplitude calculator 172 receives the electrical torque reference 102 as well as the rotational speed of the generator which are provided to an averaging module 104. The output of the averaging module is supplied to a subtraction element 106 whose output is provided to an absolute value determination module 108 whose output is averaged using the average element 110. The output of the average element 110 is multiplied by PI/2 in element 112 and the output is subtracted from the result of the subtraction element 106 to provide the maximum amplitude 114 of the torque.

Figure 5:
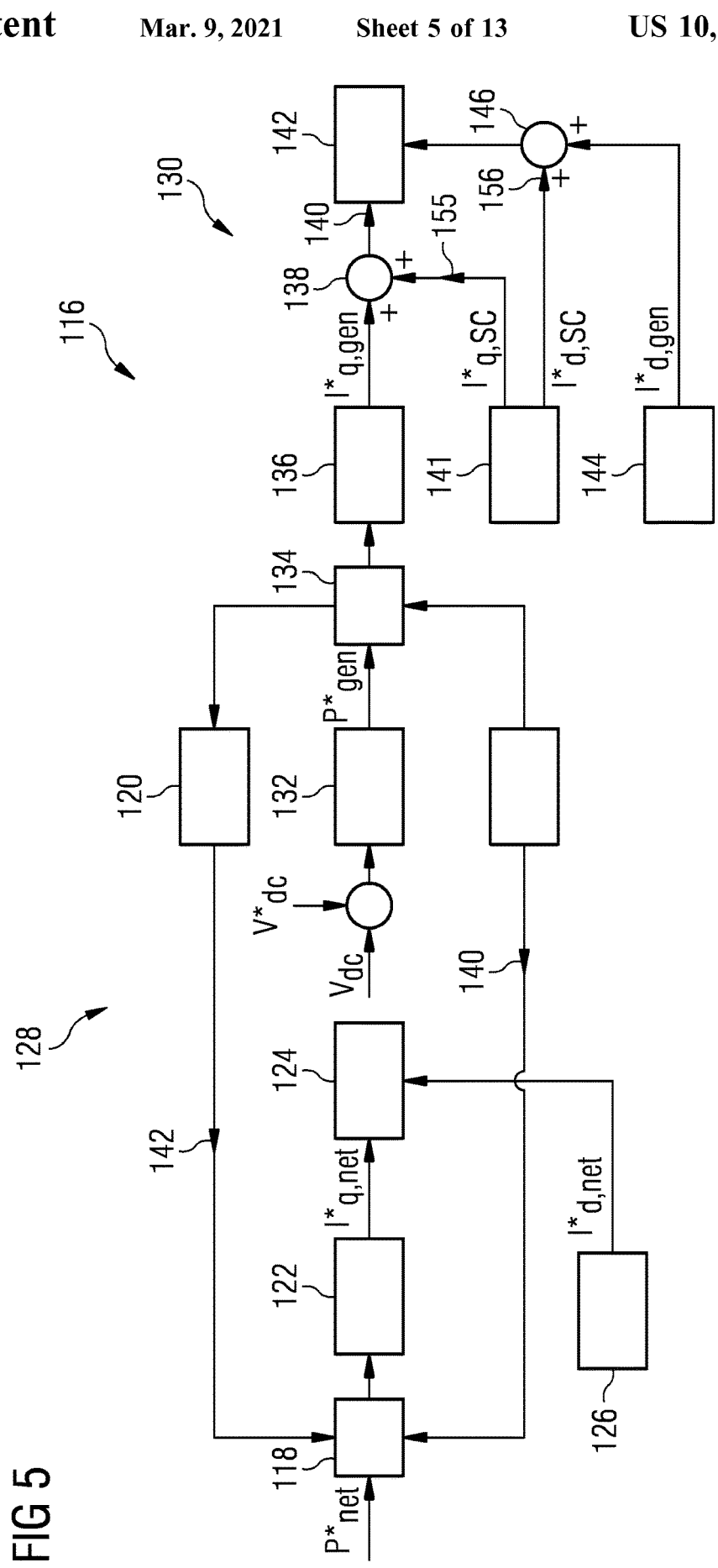

FIG. 5 schematically illustrates an implementation of an arrangement 116 for controlling a multi winding set permanent magnet electrical machine according to an embodiment of the present invention (also referred to as short-circuit controller), when $V_{dc}$ control is implemented on the generator side under normal operation. The procedure of limiting a given reference current as mentioned before is naturally forced by the hardware constraints (converter and generator), namely its rated current. Accordingly, the total current reference must respect the condition below:

$$I_{total}^* = \sqrt{(I_{d,gen}^* + I_{d,SC}^*)^2 + (I_{q,gen}^* + I_{q,SC}^*)^2},$$
$$I_{total}^* \leq I_{rated}$$

Finally, it is worth noting that Id control may be preferred alone for the sake of simplicity of implementation.

A reference selector in FIG. 5 of the arrangement 116 as labelled with reference sign 118 receives a reference of the grid power and further receives a short-circuit detection signal 140 as well as a signal of the network power 142 which is determined by a conversion module 120 which converts the generator power to the network power. The output of the reference selector 118 is provided to a grid Iq reference calculation module 122 which calculates therefrom a reference of the q-component of the currents which is provided to a grid current controller 124 to which also a reference of the d-component of the current is provided which is calculated by a grid Id reference calculation module 126.

The arrangement 116 comprises a grid side portion 128 and a generator side portion 130. Under normal operation, the control of the voltage at the DC-link (127, 129 in FIG. 1) is implemented on the generator side portion 130. A voltage controller 132 at the generator side portion 130 receives the difference between the measured DC voltage and a reference of the DC voltage and generates a reference for the power which is provided to a reference selector 134. The output of the reference selector 134 is provided to an Iq reference calculation module 136 which outputs the q-component of the reference for the generator which is provided to an addition element 138.

The short-circuit controller 141 provides the fault references 155 as well as 156 for the q-component as well as the d-component of the fault references of the currents. The q-component 140 of the total reference current is provided to the generator current controller 142. A Id reference calculation module 144 outputs a generator reference of the d-component of the currents and provides it to an addition element 146 to which also the fault reference of the d-component of the currents 156 is provided. The result of the addition element 146 is also provided to the generator current controller 142.

When there is a fault in one of the windings of the electrical machine 111, the arrangement 116 may switch such as the generator side portion 130 provides torque control and the grid side portion provides voltage control of the DC-link. Such is achieved by switching the positions of selectors 118 and 134, resulting in 122 receiving 142 instead of P*net and 136 receiving a null value instead of P*gen (accordingly, I*q,gen is equal to zero under faulty operation).

For validation of the idea of Id control, a simulation of a 2-phase short-circuit fault in one system of a generator has been performed and the current angle has been changed several times. FIGS. 6 to 11 illustrate graphs having abscissas 148 indicating the rotor position and having ordinates 150 representing the torque, the phase current of the faulty system, the phase current of the healthy system, the current angle and the torque, respectively.

Figure 6:
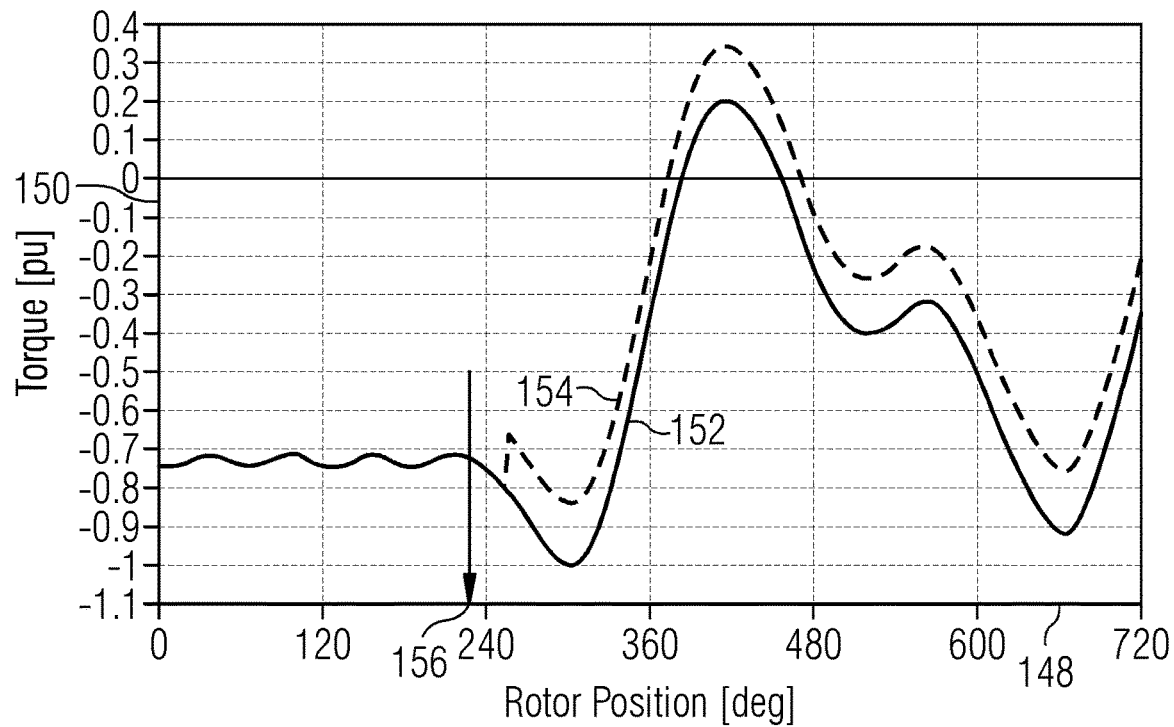
FIG. 6 illustrates a first graph for explaining control procedures according to embodiments of the present invention.

The curve 152 in FIG. 6 indicates the torque without current angle control and the curve 154 indicates the torque with current angle control according to embodiments of the present invention. Thereby, a fault occurred at the rotor position labelled with reference sign 156. Due to the current angle control, the torque is lower in a region of rotor positions after the fault occurrence, while the torque is even higher than the torque without control in a range later on.

Figure 7:
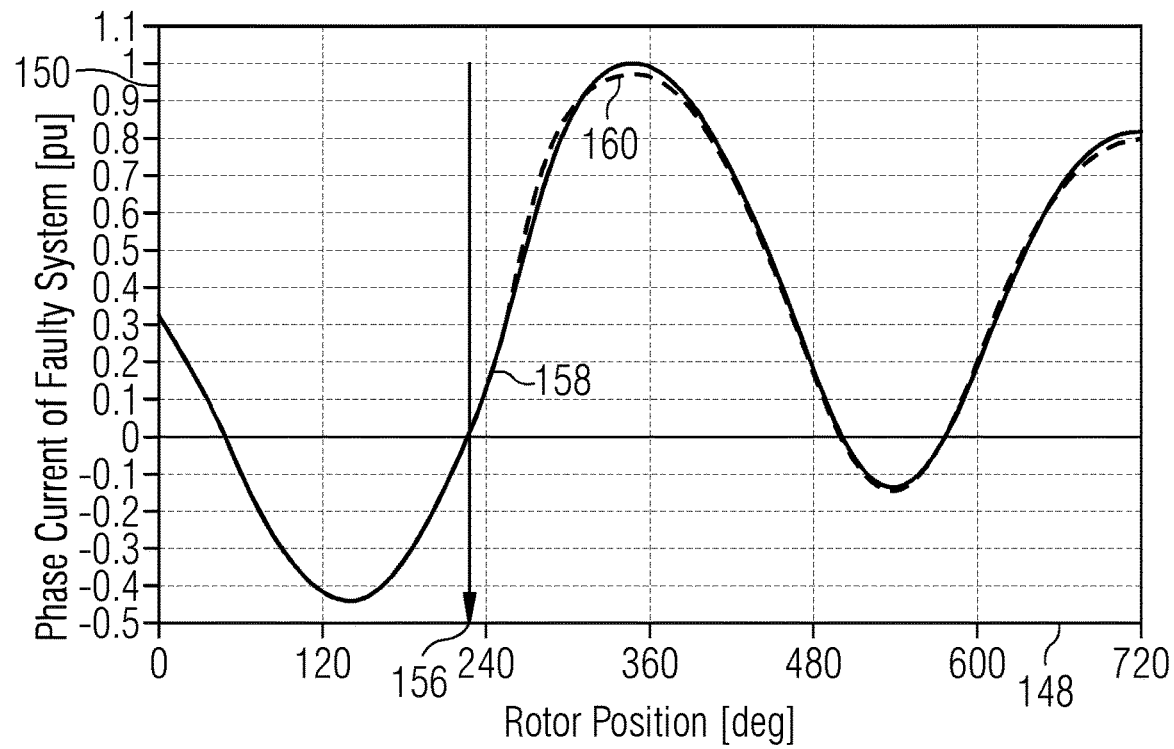
FIG. 7 illustrates a second graph for explaining control procedures according to embodiments of the present invention.

The curves 158, 160 in FIG. 7 indicate the phase current of the faulty system without angle control and with angle control, respectively.

Figure 8:
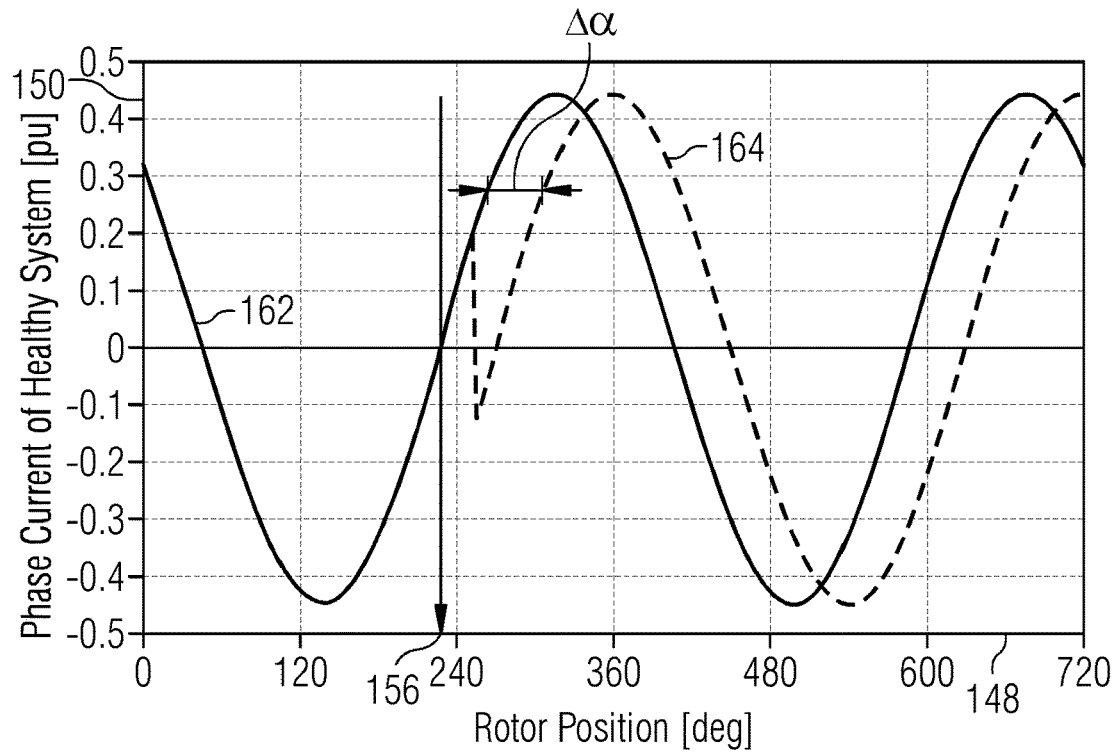
FIG. 8 illustrates a third graph for explaining control procedures according to embodiments of the present invention.

The curves 162, 164 in FIG. 8 indicate the phase current of the healthy systems without angle control and with current angle control according to embodiments of the present invention, respectively. As can be appreciated from FIG. 8, the angle of the current according to control methods (curve 164 is shifted by an amount Δct relative to the curve 162 without control.

Figure 9:
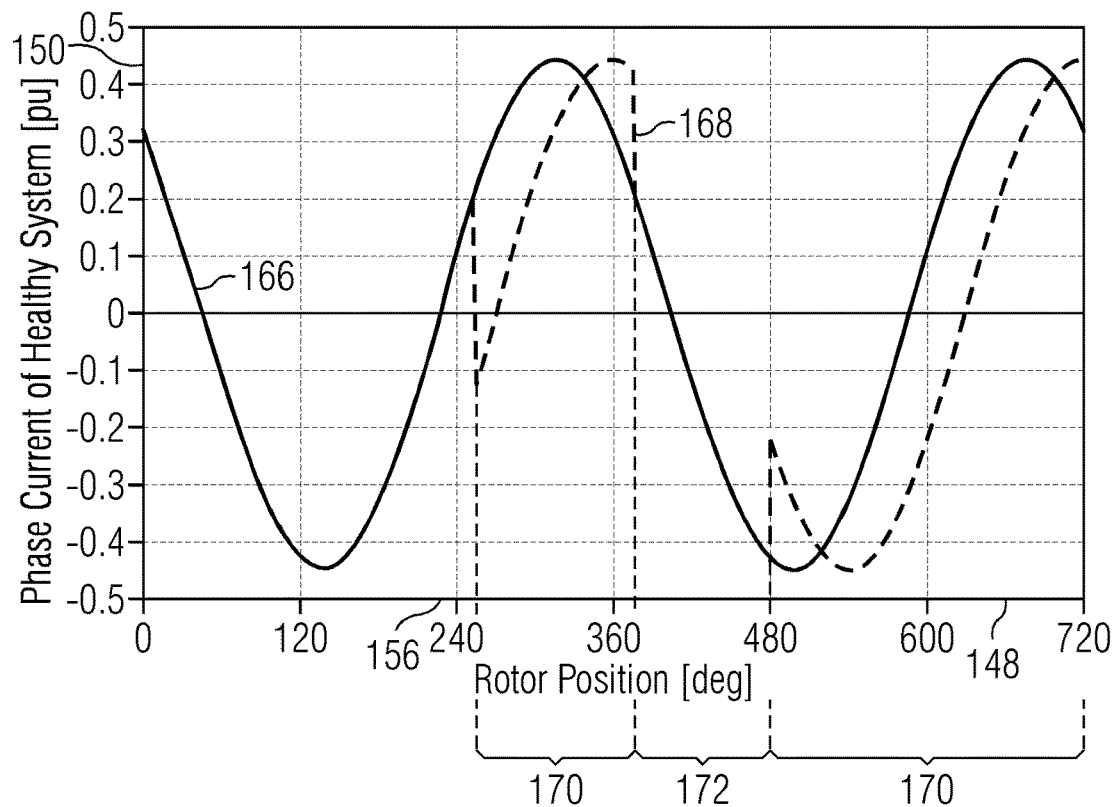
FIG. 9 illustrates a fourth graph for explaining control procedures according to embodiments of the present invention.

The curves 166, 168 in FIG. 9 illustrate the phase current of the healthy system without control and with control according to embodiments of the present invention, respectively. As can be appreciated from the curve 168, the current angle has been changed several times such that the lag of the current behind the voltage is increased in a portion 170 of the rotor position and the current angle is set to the normal control in other portions 172 of the rotor position. Thus, the current angle is changed several times.

Figure 10:
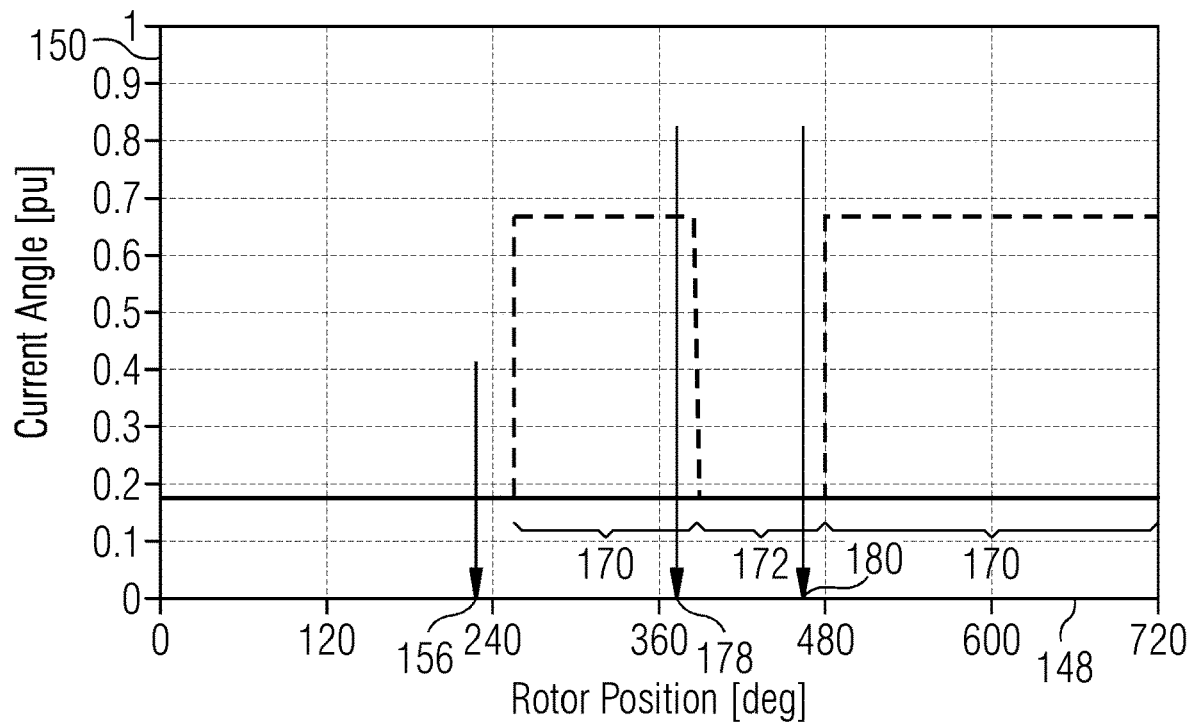
FIG. 10 illustrates a fifth graph for explaining control procedures according to embodiments of the present invention.

The current angle is illustrated in FIG. 10 together with rotor positions 178 where the torque turns positive and a position 180 where the torque turns negative. As can be appreciated from FIG. 10, the current angle is increased after the fault currents for a particular rotor position range 170 and is set to the not increased value in another rotor position range 172 after the torque turns positive. After the torque turns negative, the current angle is again set to an increased value in the rotor position range 170.

Figure 11:
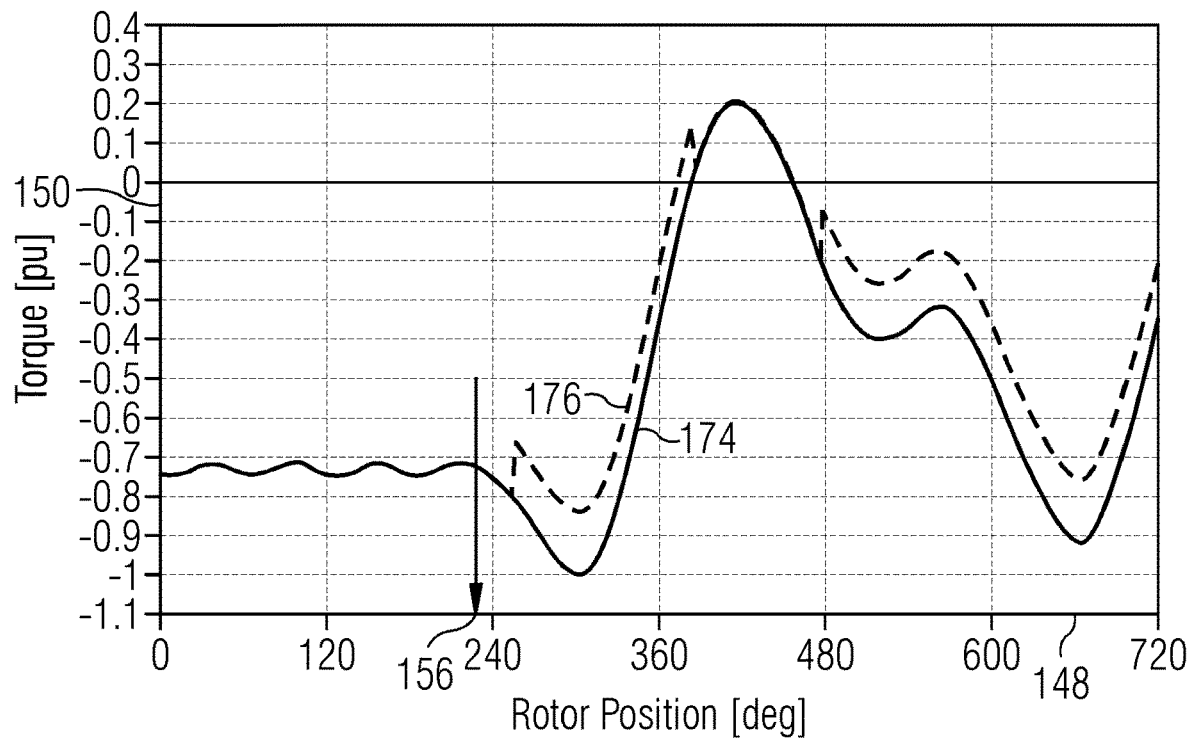
FIG. 11 illustrates a sixth graph for explaining control procedures according to embodiments of the present invention.

The consequential short-circuit torque is illustrated as curves 174, 176, respectively, in FIG. 11 for no current angle control and angle control according to embodiments of the present invention.

The curve 176 in FIG. 11 shows a 13% reduction in the peak-to-peak torque (torque oscillation). Again, a delay in current angle change can be noticed, this is to simulate the possible real-world delay in sensing the fault as well as in sensing the torque change (negative to positive and vice versa).

Figure 12:
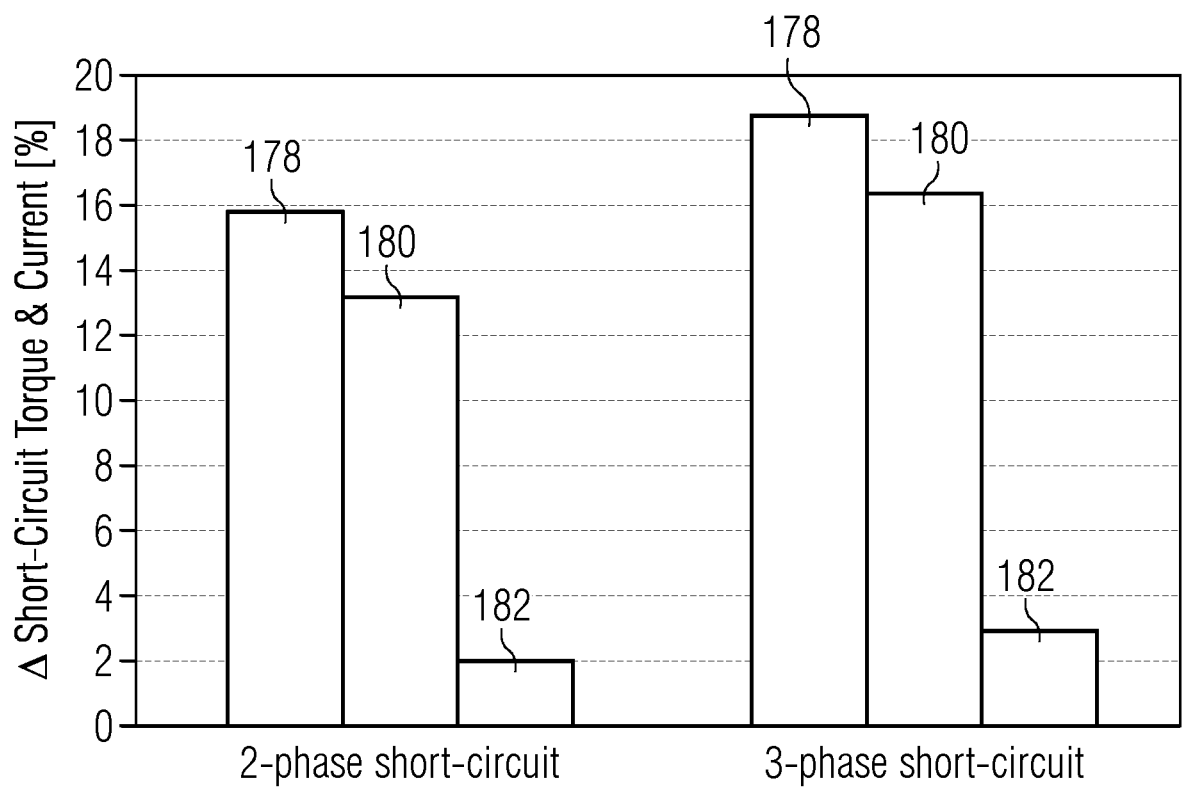
FIG. 12 illustrates a graph showing advantages achieved by embodiments of the present invention.

Furthermore, three-phase short-circuit simulations have also been carried out to show that the proposed technique is still effective, as can be taken from FIG. 12. FIG. 12 summarizes the reduction of the peak torque and torque oscillations (peak-to-peak) and peak current due to both 2- and 3-phase short-circuit faults. It is clear that the effectiveness could be even more significant for the three-phase short-circuit faults. Columns 178 indicate the Amax torque (difference between absolute maximum peak torques with and without current angle control), columns 180 indicate the Δp2p torque (difference between torque oscillation, i.e. peak to peak, with and without current angle control) and the columns 182 indicate the Δ peak current control (difference between absolute maximum peak phase current with and without current angle control.

Figure 13:
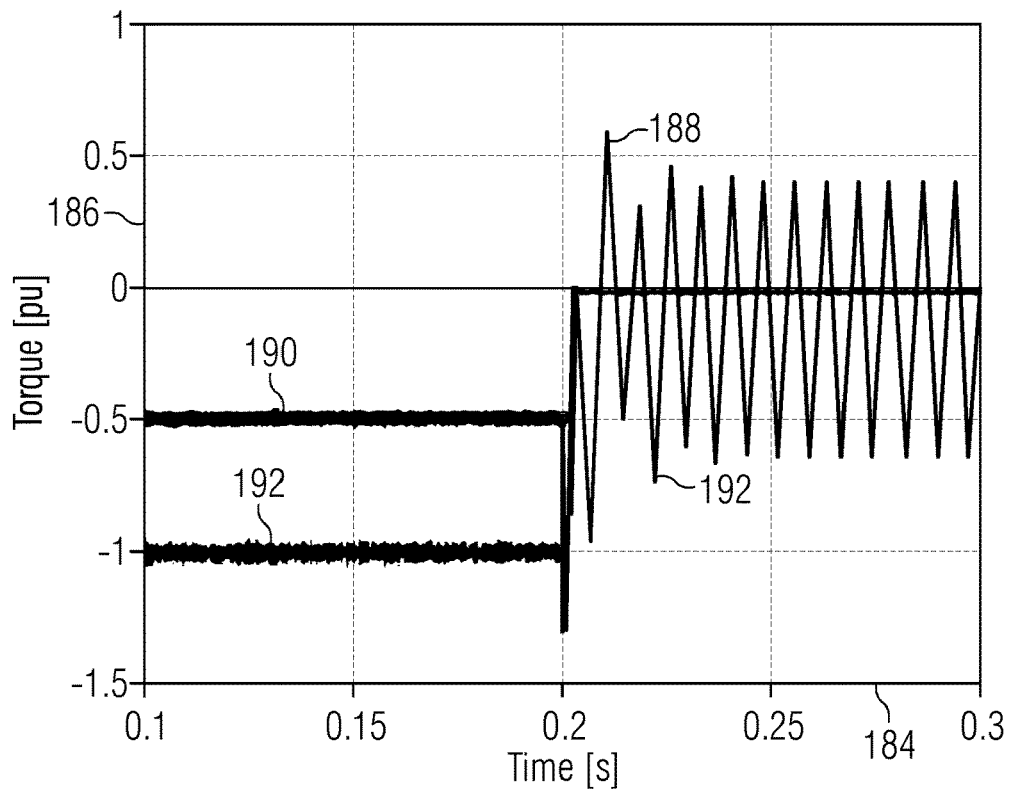
FIG. 13 illustrates simulation results according to methods of the present invention.
Figure 14:
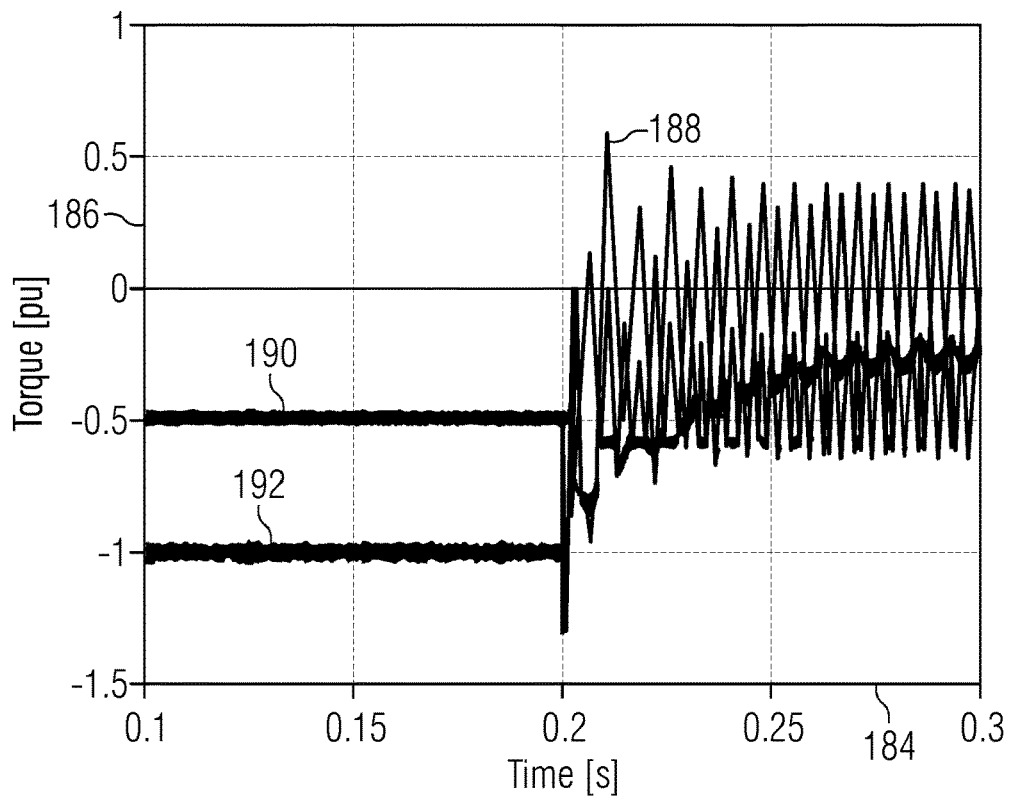
FIG. 14 illustrates simulation results according to methods of the present invention.
Figure 15:
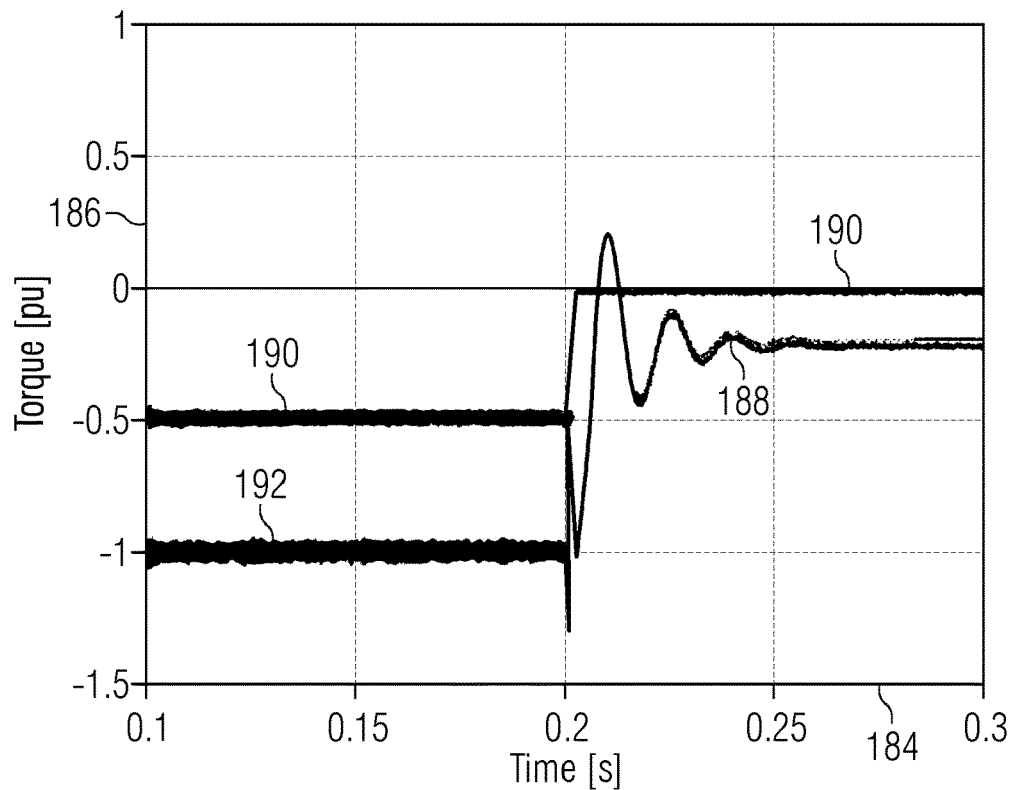
FIG. 15 illustrates simulation results according to methods of the present invention.
Figure 16:
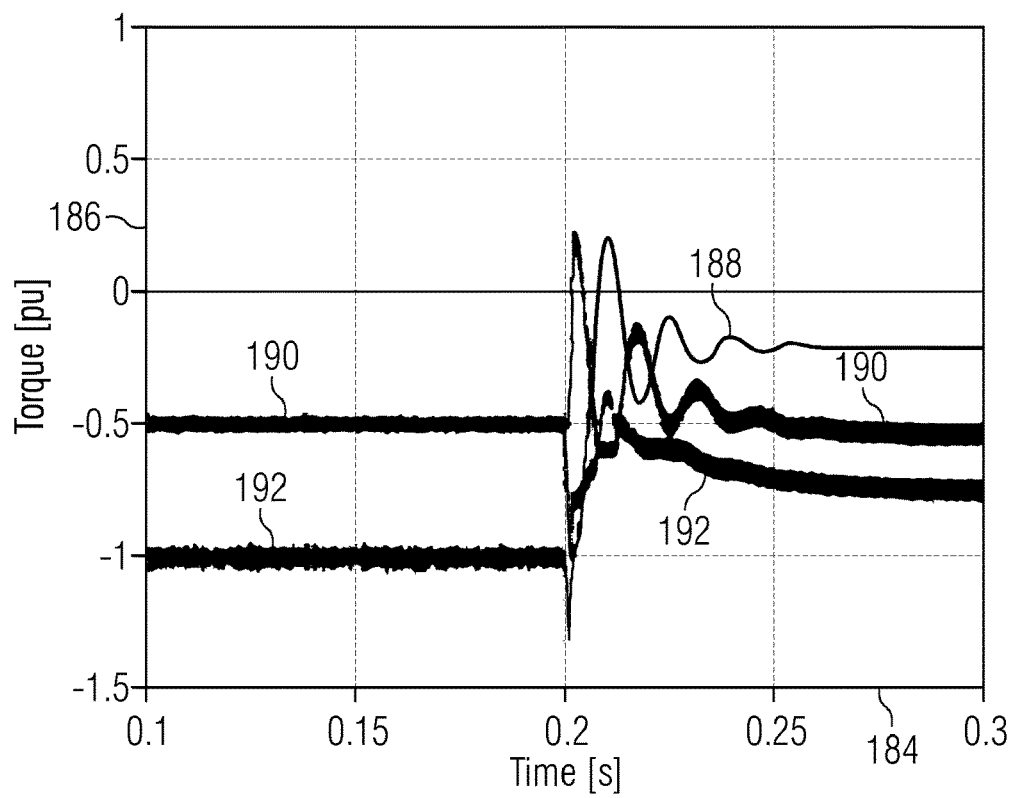
FIG. 16 illustrates simulation results according to methods of the present invention.

FIGS. 13 to 16 have abscissas 184 indicating the time and ordinates 186 indicating the torque. The torque 188 generated by the first winding set, the torque 190 generated by the second winding set and the torque 192 generated by both winding sets respectively, is shown. Thereby, FIG. 13 illustrates the phase-to-phase short-circuit without short-circuit torque control, FIG. 14 illustrates the phase-to-phase short-circuit with short-circuit torque control, FIG. 15 illustrates the three-phase short-circuit without short-circuit torque control and FIG. 16 illustrates the three-phase short-circuit with short-circuit torque control. Therefore, it is clear the effectiveness of employing short-circuit torque control in order to reduce torque oscillations and stop the machine in a shorter time period.

Figure 17:
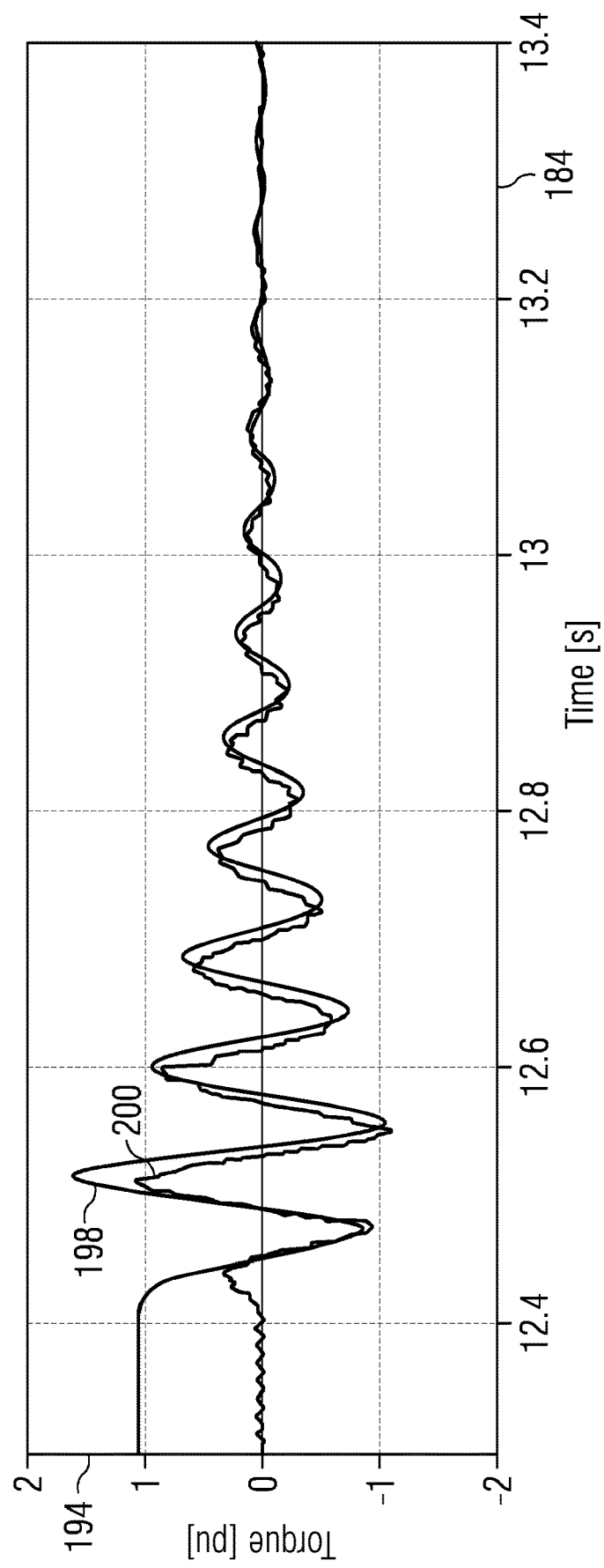
FIG. 17 illustrates experimental results associated with the determination of a torque according to embodiments of the present invention.
Figure 18:
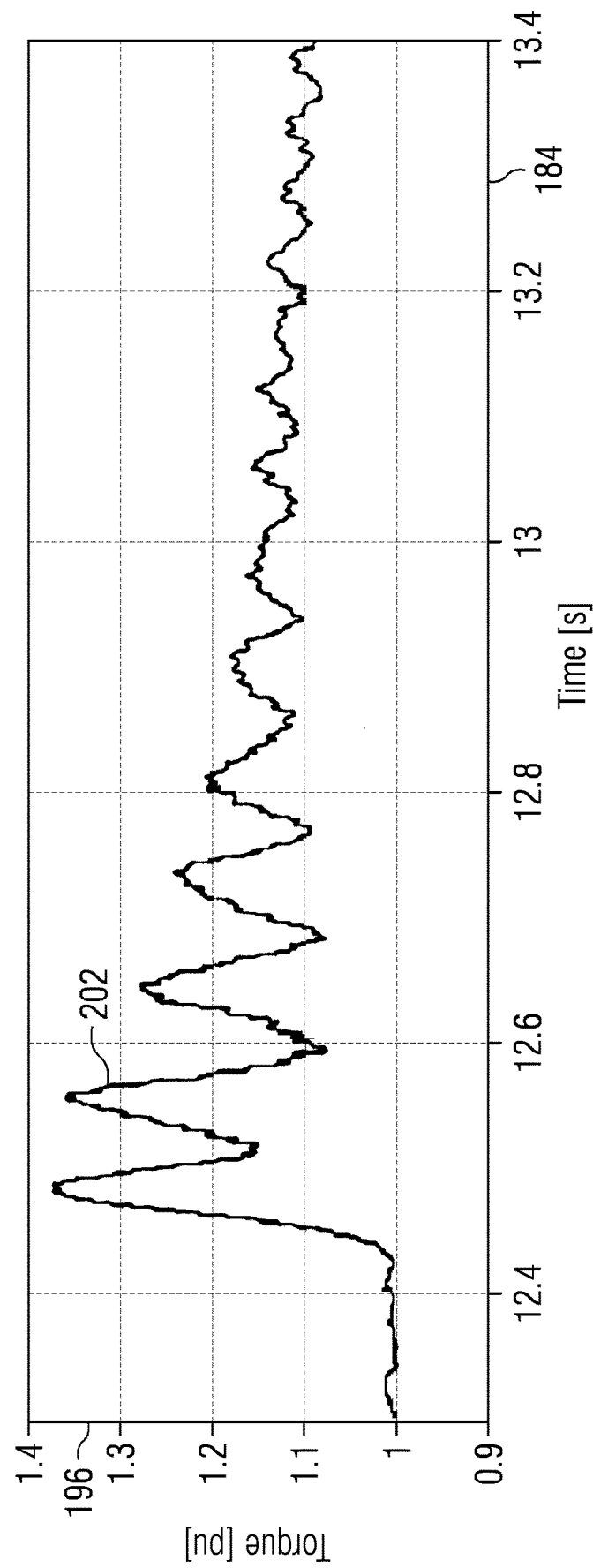
FIG. 18 illustrates experimental results associated with the determination of a torque according to embodiments of the present invention.

FIGS. 17 and 18 have abscissas 184 illustrating the time and having ordinates 194 illustrating the torque and 196 illustrating the speed of the generator. The curve 198 in FIG. 17 illustrates the measured torque, while the curve 200 illustrates the scaled measured acceleration as measured by an accelerometer. Thus, an accelerator may be used as a feedback sensor, because it shows the same or at least similar oscillatory pattern as the measured torque 198. Furthermore, the speed signal 202 illustrated in FIG. 18 indicates, that the control of speed oscillations should result in the damping of torque oscillations with lack of need for load torque estimation.

Assuming that a short-circuit fault occurs in winding 1, Te,1 shows large oscillations, whereas Te,2 is controlled in order to provide a load torque (TLoad) as smooth as possible. Additionally, Te,2 is also controlled in order to assume the maximum possible average value without exceeding its maximum amplitude (Temax,2), allowing a faster slowdown of the generator speed. Naturally, the resulting TLoad will depend on the short-circuit nature as well as on the value Temax,2. Thus, it is possible to improve the system response to a short-circuit by over-loading winding 2 for a short time period (Temax,2 assumes a higher value under a short-circuit).

As previously mentioned, the nature of a short-circuit fault is usually unknown as well as the ideal/maximum load torque reference. Therefore, it is proposed to generate the load torque reference in an adaptive manner (option to maximize breaking torque (170) in FIG. 3):

$$T_{Load}^* = T_{initial}^* + T_\Delta^*$$

where $T_\Delta^*$ is derived in order to provide maximum average load torque (for faster stop) without exceeding maximum permissible torque for the healthy stator (Temax,n). Regarding T*initial, it may be set to a given value based in simulation/experimental results in order to provide optimum dynamic performance. Simulation results in FIGS. 13 to 16 were obtained with T*initial=0.5Temax,2.

Maximum amplitude calculator block may be as FIG. 4 or any other suitable alternative technique allowing obtaining the maximum amplitude of the reference torque for the healthy converter over a period corresponding to two times the fundamental electrical frequency.

For the sake of simplicity, Iq reference calculation block may be as follow:

$$I_{q,SC}^* = T_{e,n}^* \frac{2}{3p\psi_{PM}}$$

but alternative equations may be implemented too, where p and ΨPM stand for number of pole pairs and permanent magnet flux respectively.

Provided that the generator has more than two winding sets, for instance n winding sets, I*q,SC may be divided by the number of healthy stators (n−1), and Iq reference is given by I*q,SC/(n−1). Alternative approaches may also be adopted, such as attributing oscillation damping to a single healthy stator and using the remaining ones to generate maximum constant torque.

Regarding the bandwidth of PI controllers 1 and 2 (177 and 174) in FIG. 3, a higher bandwidth value is required for controller 1 in comparison to controller 2, since controller 1 is intended for controlling torque oscillation, while controller 2 adjusts the average torque. Alternatively to a PI controller, a resonant controller or any other suitable option may be employed for controller 1. Moreover, it is worth pointing out that a high bandwidth for the fundamental current controller (current controllers 1 and 2 (162a and 162b) in FIG. 2) is also a requirement in order to provide satisfactory dynamic performance, therefore, a dedicated value may be set when enabling short-circuit torque controller.

To switch I*q reference from normal operation to short-circuit torque control mode is straight forward when torque control is implemented in the generator-side converter and the dc-link voltage controller is implemented in the grid-side converter, i.e., no more changes are required. On the other hand, if in normal operation I*q is generated by means of a dc-link voltage controller implemented in the generator-side controller, e.g. US 2007/0108771 A1, there is the additional need to switch the dc-link voltage control to the grid-side simultaneously, changing the reference current calculation for both generator and grid sides. The required modifications in the latter case are illustrated in FIG. 5, where after a short-circuit fault detection P*gen is sent to the net-side control.

Results in FIG. 13-16 show the electromagnetic torque behaviour under two distinct short-circuit scenarios without and with short-circuit torque control. FIG. 13 shows that a phase-to-phase short-circuit introduces large torque oscillations, which are drastically reduced by enabling the short-circuit torque controller in the healthy stator as shown in FIG. 14. It is clear in FIG. 14 that the overall electromagnetic torque is not completely free of oscillations (Te), which is a consequence of Te2 reaching its limit (Te2,max), preventing further damping of the oscillation forced by Te1.

Embodiments of the present invention provide:
- a solution for damping torque oscillations as a consequence of a short-circuit fault in one of the stators of a multi stator machine, requiring the availability of a torque or a current feedback source only.
- Reduction of turbine extreme loads, usually resulting from generator short-circuit faults. Significantly lower peak torque, torque oscillation and peak phase current during short-circuit faults, for example 2- or 3-phase short-circuit.
- Improved wind turbine protection by mitigating the risk of blade damage as a consequence of generator short-circuit faults.
- Improved generator protection by preventing over-speed events and extinguishing short-circuit currents in a shorter time period.
- Reduction in the support structure of the turbine so lighter weight and lower cost to produce, transport and install.
- Lower risk of irreversible demagnetization, reducing the magnet volume leading to lower manufacturing cost.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A method for controlling a multi winding set permanent magnet electrical machine in case of a fault in a first group of winding sets leaving a second group of winding sets functional, the method comprising:
determining a value of a torque generated by all winding sets; and
controlling values of currents of the second group of winding sets based on the value of the torque to reduce a damaging torque and/or a torque oscillation occurring and/or to brake the multi winding set permanent magnet electrical machine, wherein the controlling values of currents of the second group comprises controlling values of a d-component and/or a q-component of the currents of the second group of winding sets based on the value of the torque, wherein the controlling the values of the d-component of the currents of the second group of winding sets comprises setting a fault reference value of the d-component of the currents of the second group of winding sets based on a sign of the value of the torque, wherein if sign of the value of the torque is negative, the fault reference value of the d-component of the currents is set to a negative value supported by converters connected to the second group of winding sets.

2. The method according to claim 1, wherein if sign of the value of the torque is positive, the fault reference value of the d-component of the currents is set to a value being smaller than the absolute value of the negative value.

3. The method according to claim 1, wherein the controlling the values of the q-component of the currents of the second group of winding sets comprises:
deriving a reference of a counteracting torque counteracting a torque oscillation based on an oscillation portion using a band/high pass filter of the determined value of the torque; and
deriving a fault reference of the q-component of the currents from the reference of the counteracting torque.

4. The method according to claim 1, wherein the controlling values of the q-component of the currents of the second group of winding sets comprises:
deriving a reference of a counteracting braking torque counteracting a torque oscillation and braking the machine, based on an oscillation portion of the determined value of the torque and a braking torque reference; and
deriving a fault reference of the q-component of the currents from the reference of the counteracting braking torque.

5. The method according to claim 4, wherein the braking torque reference is determined such that the reference of a counteracting breaking torque is below a maximally possible torque that can be generated by the second winding sets, and/or converters connected to the second winding set.

6. The method according to claim 4, wherein deriving a fault reference of the q-component of the currents further comprises applying a limitation on torque and/or current.

7. The method according to claim 1, wherein determining a value of the torque comprises:
measuring the torque; and/or
measuring, using at least one accelerometer, a vibration of at least one component of the machine or wind turbine or a speed of the rotor; and
deriving the value of a torque from the measured vibration or the measured speed; and/or
estimating the torque by using one or more observers of speed of rotor and/or electromagnetic torque of the second group of winding sets.

8. The method according to claim 1, wherein the second group of winding sets is connected respectively to a second group of converters, wherein the controlling values of currents of the second group of winding sets comprises controlling the second group of converters.

9. The method according to claim 1, wherein, before the fault, the first group of winding sets is connected respectively to a first group of converters, and after detection of the fault, the first group of winding sets are disconnected from the first group of converters.

10. The method according to claim 1, wherein the first group of winding sets is connected to a first group of converters and wherein the second group of winding sets is connected to a second group of converters, each one of the first and/or the second group of converters comprises a generator side converter, a DC-link and a grid side converter,
wherein before detection of the fault, the generator side converters perform voltage control of the DC-link;
wherein after detection of the fault, the generator side converters switch to torque control;

wherein after detection of the fault, the grid side converters switch to voltage control of the DC-link.

11. The method according to claim 1, further comprising:
dividing the fault reference value of the d-component and/or the fault reference value of the q-component of the currents of the second group of winding sets, in respective reference portions independent of converters connected to the second group of winding sets; and
supplying to each of the converters connected to the second group of converters a reference signal that depends on one of the reference portions.

12. An arrangement for controlling a multi winding set permanent magnet electrical machine in case of a fault in a first group of winding sets leaving a second group of winding sets functional, the arrangement comprising:
a determining portion configured to determine a value of a torque generated by all winding sets; and
a controller configured to control values of currents of the second group of winding sets based on a value of a torque to reduce a damaging torque and/or a torque oscillation occurring and/or to brake the multi winding set permanent magnet electrical machine, wherein the controller is further configured to control values of a d-component and/or a q-component of the currents of the second group of winding sets based on the value of the torque and set a fault reference value of the d-component of the currents of the second group of winding sets based on a sign of the value of the torque, wherein if sign of the value of the torque is negative, the fault reference value of the d-component of the currents is set to a negative value supported by converters connected to the second group of winding sets.

* * * * *